US011388458B1

(12) United States Patent
Cohen

(10) Patent No.: US 11,388,458 B1
(45) Date of Patent: Jul. 12, 2022

(54) SYSTEMS AND METHODS FOR TAILORING MEDIA ENCODING TO PLAYBACK ENVIRONMENTS

(71) Applicant: Meta Platforms, Inc., Menlo Park, CA (US)

(72) Inventor: Zachary Cohen, Mill Valley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/123,690

(22) Filed: Dec. 16, 2020

(51) Int. Cl.
*H04N 21/2387* (2011.01)
*H04N 21/235* (2011.01)
*G06F 16/435* (2019.01)
*H04N 21/238* (2011.01)
*G06F 16/438* (2019.01)

(52) U.S. Cl.
CPC ....... *H04N 21/2387* (2013.01); *G06F 16/435* (2019.01); *G06F 16/438* (2019.01); *H04N 21/2353* (2013.01); *H04N 21/23805* (2013.01)

(58) Field of Classification Search
CPC ......... H04N 21/2387; H04N 21/23805; H04N 21/2353; G06F 16/438; G06F 16/435
See application file for complete search history.

(56) References Cited

U.S. PATENT DOCUMENTS

| 2010/0250772 | A1* | 9/2010 | Mao | H04N 21/23103 709/231 |
| 2014/0082212 | A1* | 3/2014 | Garg | H04N 21/2402 709/233 |

* cited by examiner

*Primary Examiner* — Jefferey F Harold
*Assistant Examiner* — Franklin S Andramuno
(74) *Attorney, Agent, or Firm* — FisherBroyles, LLP

(57) ABSTRACT

The disclosed system may include various modules that are stored in memory and executed by a physical processor. The disclosed system may (1) receive a request to stream presentation data to a computing device, (2) determine at least one characteristic of the computing device in connection with the request, (3) identify a compressed version of the presentation data that corresponds to the characteristic of the computing device, and then (4) stream the compressed version of the presentation data to the computing device to facilitate presentation of the presentation data to a user of the computing device. Various other systems, devices, and methods are also disclosed.

18 Claims, 8 Drawing Sheets

SYSTEMS AND METHODS FOR TAILORING MEDIA ENCODING TO PLAYBACK ENVIRONMENTS

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
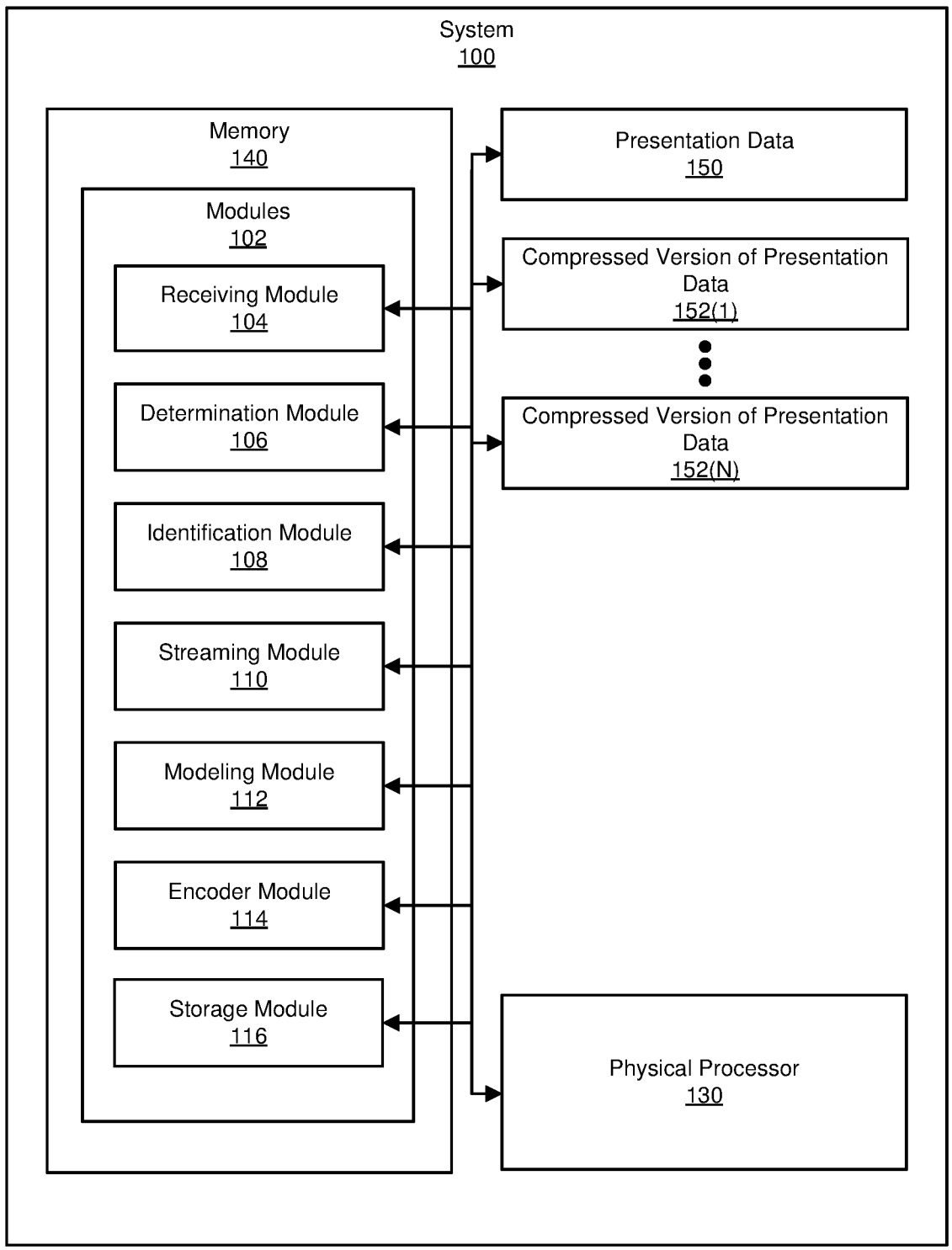
FIG. 1 is a block diagram of an exemplary system for tailoring media encoding to playback environments.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to systems and methods for tailoring media encoding to playback environments. As will be explained in greater detail below, these systems and methods may provide numerous features and benefits.

Media (such as audio and video) is often streamed from source devices to destination devices for presentation to users. To reduce the bandwidth of such streams, the source device may compress the media before streaming. To do so, the source device may apply a certain compression standard, codec, and/or algorithm, such as Advanced Audio Coding (AAC), MP3, Vorbis, Free Lossless Audio Codec (FLAC), and/or Opus. Some of these standards, codecs, and/or algorithms may provide and/or constitute a general coding format that is agnostic to the playback environment (e.g., the destination device on which the user experiences the streaming media).

Unfortunately, such agnosticism to the playback environment may be somewhat inefficient in terms of bandwidth. For example, a streaming media service may apply AAC encoding to an audio file before streaming the same to a mobile device. In this example, the encoded audio file may include and/or contain audio content and/or data that is effectively lost on the mobile device and/or its user due at least in part to certain limitations and/or characteristics of the mobile device (e.g., the frequency response of the mobile device's built-in speaker and/or headphones or external speakers communicatively coupled to the mobile device). As a result, the encoded audio file may include and/or contain more data than is necessary to achieve optimal performance of the corresponding audio content during playback on the mobile device, thereby potentially wasting a certain amount of bandwidth during the streaming session.

As an alternative example, the encoded audio file may lack and/or be missing some audio content and/or data that the mobile device could have perceivably presented to the user due at least in part to certain advanced features and/or characteristics of the mobile device (e.g., advanced capabilities of the mobile device's built-in speaker and/or headphones or external speakers communicatively coupled to the mobile device). As a result, the encoded audio file may include and/or contain less data than is necessary to achieve optimal performance of the corresponding audio content during playback on the mobile device, thereby potentially impairing and/or limiting the user's experience by failing to take full advantage of the playback environment's capabilities during the streaming session.

The present disclosure, therefore, identifies and addresses a need for systems and methods for tailoring media encoding to playback environments. The systems and methods described herein may provide one or more advantages over traditional media encoding practices and/or techniques. For example, by determining certain features and/or characteristics of a playback environment, these systems and methods may be able to select which compressed version of the requested audio file best fits, matches, and/or corresponds to that playback environment. In other words, these systems and methods may optimize the media stream to transfer only data that the playback environment is able to perceivably present to the user. As a result, these systems and methods may be able to optimize bandwidth usage of the media stream based at least in part on the capabilities of the playback environment.

The following will provide, with reference to FIGS. 1, 2, and 4-8, detailed descriptions of various systems, components, and/or implementations capable of tailoring media encoding to playback environments. The discussion corresponding to FIG. 3 will provide detailed descriptions of an exemplary method for tailoring media encoding to playback environments.

FIG. 1 is a block diagram of an exemplary system 100 for tailoring media encoding to playback environments. As illustrated in this figure, exemplary system 100 may include one or more modules 102 for performing one or more tasks. As will be explained in greater detail below, modules 102 may include a receiving module 104, a determination module 106, an identification module 108, a streaming module 110, a modeling module 112, an encoder module 114, and/or a storage module 116. Although illustrated as separate elements, one or more of modules 102 in FIG. 2 may represent portions of a single module, application, and/or operating system. For example, one or more of modules 102 may represent part of and/or be included in an encoder, a decoder, and/or a transcoder.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may be stored and configured to run on one or more computing devices, such as the devices illustrated in FIG. 2 (e.g., computing device 202, computing device 208, and/or computing device 206), the devices illustrated in FIG. 4 (e.g., source device 402 and/or destination device 410), and/or the devices illustrated in FIG. 7 (e.g., one or more portions of playback environment 706(1), playback environment 706(2), playback environment 706(3), and/or playback environment 706(4)). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate tailoring media encoding to playback environments. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on Chips (SoCs), portions of one or more of the same, variations or combinations of one or more of the same, and/or any other suitable physical processor.

As illustrated in FIG. 1, exemplary system 100 may further include certain instances and/or versions of presentation data, such as presentation data 150 and/or compressed versions of presentation data 152(1)-(N). In one example, presentation data 150 may include and/or represent raw, original, and/or uncompressed media data (such as audio and/or video data). In this example, compressed versions of presentation data 152(1)-(N) may include and/or represent encoded and/or compressed representations of presentation data 150. For example, each compressed version of presentation data 152 may result and/or derive from the application of a different loss model and/or encoder to presentation data 150.

In one example, presentation data 150 may include and/or represent a single media file and/or instance. In this example, compressed versions of presentation data 152(1)-(N) may include and/or represent different encoded instances of that single media file. Although not necessarily illustrated in this way in FIG. 1, system 100 may also include and/or represent various other media files and/or instances in addition to presentation data 150.

Figure 2:
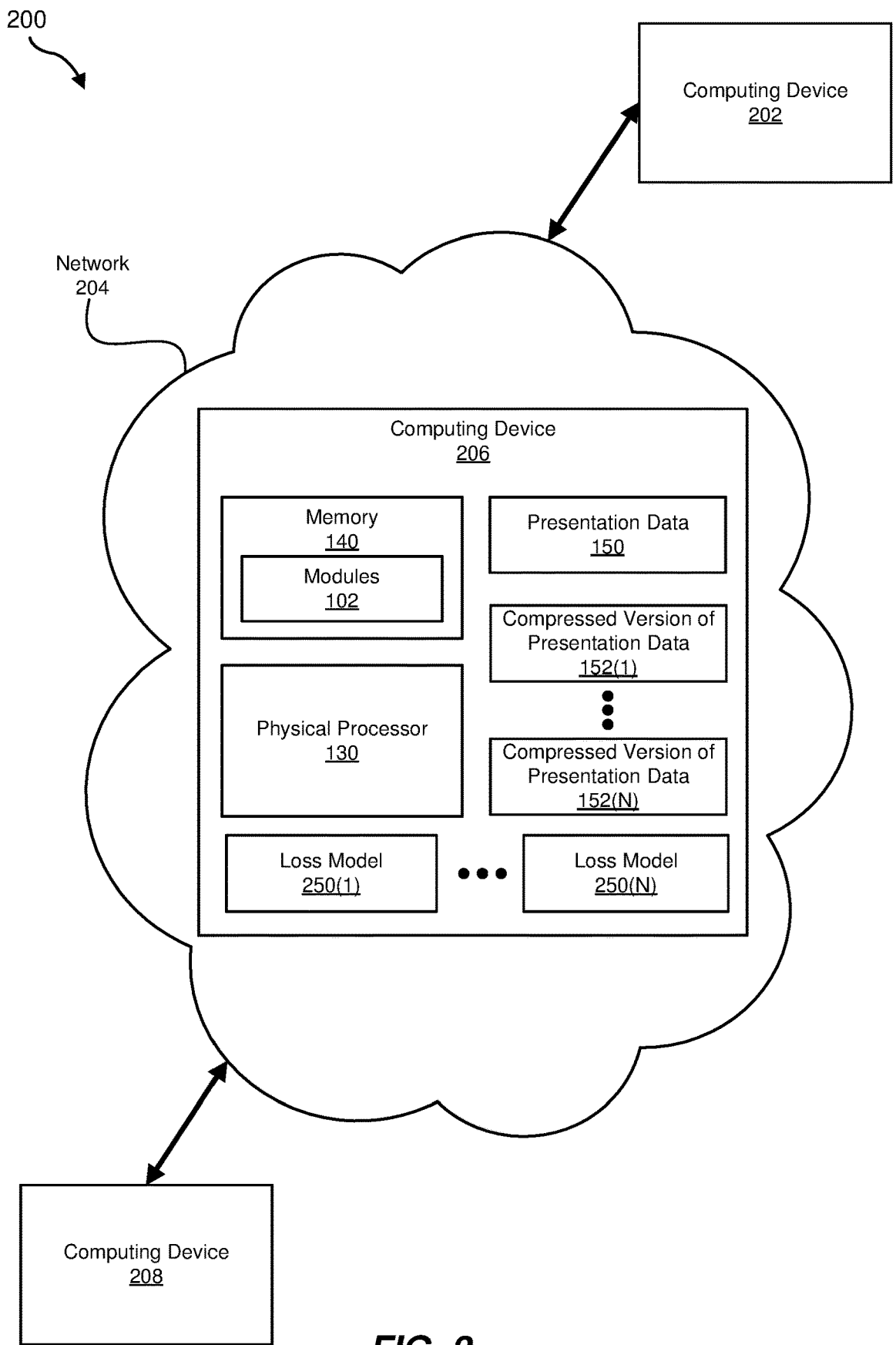
FIG. 2 is a block diagram of an additional exemplary system for tailoring media encoding to playback environments.

An apparatus for tailoring media encoding to playback environments may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing device 206, computing device 202, and/or computing device 208.

In some examples, network 204 may include and/or represent various network devices and/or nodes that form and/or establish communication paths and/or segments (although not necessarily illustrated in FIG. 2). In one example, network 204 may include computing device 206 that forwards traffic between computing device 202 and computing device 208.

In some examples, and as will be described in greater detail below, one or more of modules 102 may cause computing device 202, computing device 206, and/or computing device 208 to (1) receive a request to stream presentation data 150 to another computing device, (2) determine at least one characteristic of the other computing device in connection with the request, (3) identifying a compressed version of presentation data 150 that corresponds to the characteristic of the other computing device, and then (4) streaming the compressed version of presentation data 150 to the other computing device to facilitate presentation of presentation data 150 to a user of the other computing device.

In some examples, computing devices 202, 206, and 208 may each generally represent any type or form of physical computing device capable of reading computer-executable instructions. In one example, computing devices 202 and 208 may each include and/or represent a mobile device (e.g., a smartphone), and computing device 206 may include and/or represent a media-streaming device and/or server. Examples of computing devices 202, 206, and 208 include, without limitation, mobile devices, client devices, laptops, tablets, desktops, servers, cellular phones, Personal Digital Assistants (PDAs), multimedia players, embedded systems, wearable devices, smartwatches, gaming consoles, head-mounted displays, artificial reality devices, routers, switches, variations or combinations of one or more of the same, and/or any other suitable devices.

In some examples, network 204 may generally represent any medium or architecture capable of facilitating communication or data transfer. In one example, network 204 may include one or more of computing devices 202 and 208 even though these devices are illustrated as being external to network 204 in FIG. 2. Additionally or alternatively, network 204 may include other devices that facilitate communication among computing devices 202, 206, and/or 208 even though these other devices are not illustrated in FIG. 2. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
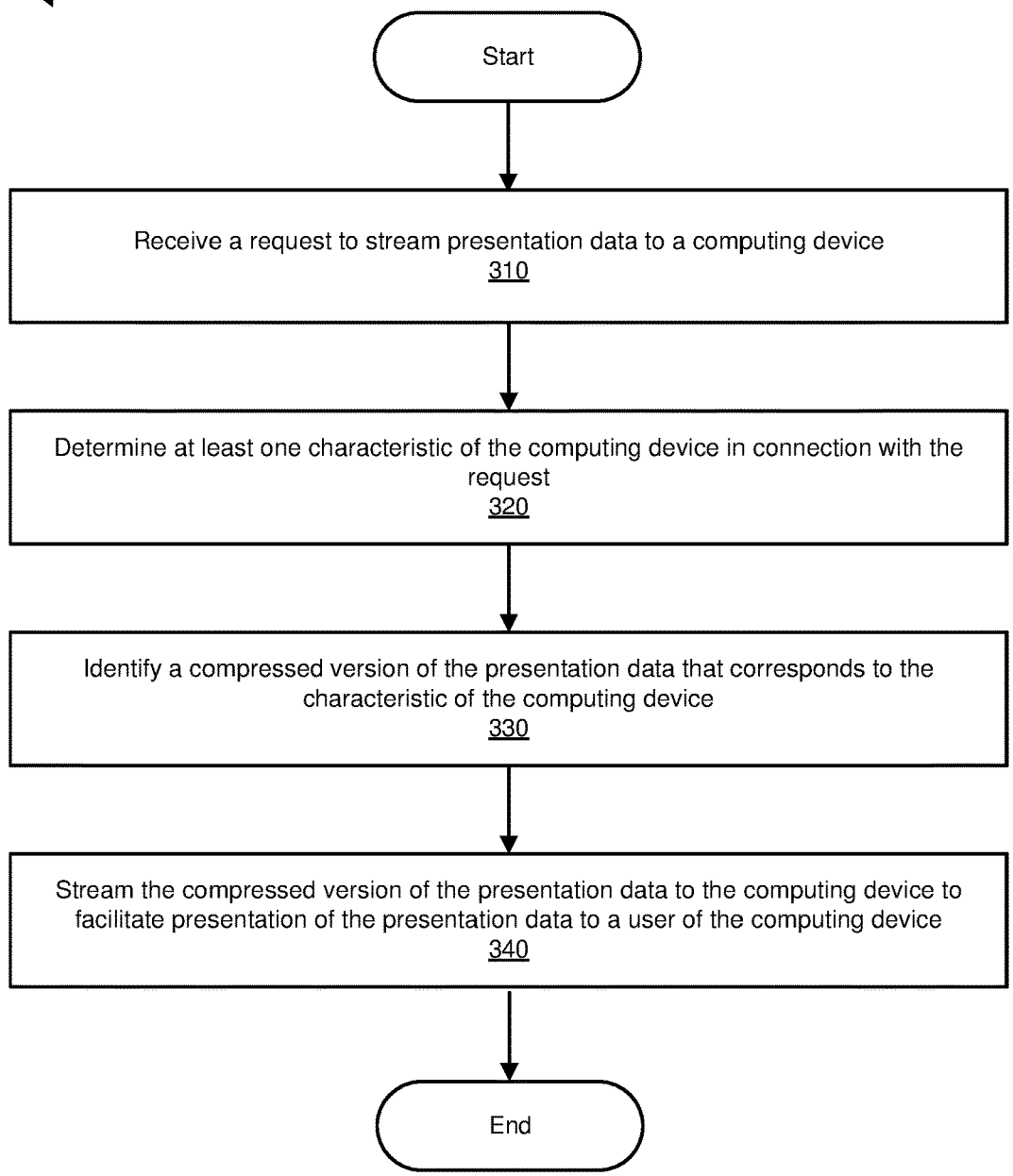
FIG. 3 is a flow diagram of an exemplary method for tailoring media encoding to playback environments.

FIG. 3 is a flow diagram of an exemplary computer-implemented method 300 for tailoring media encoding to playback environments. The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a request to stream presentation data to a computing device. For example, receiving module 104 may, as part of computing device 206 and/or computing device 208 in FIG. 2, receive a request to stream presentation data 150 to computing device 202. In this example, the request may originate and/or arrive from computing device 202. Additionally or alternatively, the request may be directed to streaming a specific audio and/or video file to computing device 202.

The systems described herein may perform step 310 in a variety of ways and/or contexts. In some examples, receiving module 104 may monitor computing device 206 and/or computing device 208 for requests to stream media files to devices operated by the streaming service's customer base. In one example, while monitoring in this way, the request to stream presentation data 150 may arrive at and/or reach computing device 206 and/or computing device 208 as part of a media streaming service. In this example, as the request arrives at and/or reaches computing device 206 and/or computing device 208 as part of the media streaming service, receiving module 104 may detect, identify, and/or receive the request.

Returning to FIG. 3, at step 320 one or more of the systems described herein may determine at least one characteristic of the computing device in connection with the request. For example, determination module 106 may, as part of computing device 206 or computing device 208 in FIG. 2, determine at least one characteristic, attribute, and/or feature of computing device 202. In some examples, the characteristic, attribute, and/or feature of computing device 202 may impact, affect, and/or indicate the device's capability or incapability to play back and/or reproduce certain portions of presentation data 150.

Examples of such characteristics, attributes, and/or features include, without limitation, the frequency response of an acoustic transducer associated with computing device 202, a material incorporated in an acoustic transducer associated with computing device 202, the size and/or dimensions of an acoustic transducer associated with computing device 202, an enclosure of an acoustic transducer associated with computing device 202, an environment in which computing device 202 is located, the make and/or model of computing device 202 or its associated acoustic transducer, the make and/or model of a video display on computing device 202 and/or an associated monitor, the size and/or specifications of a video display on computing device 202 and/or an associated monitor, combinations or variations of one or more of the same, and/or any other suitable characteristics, attributes, and/or features.

The systems described herein may perform step 320 in a variety of ways and/or contexts. In some examples, determination module 106 may determine the characteristic, attribute, and/or feature of computing device 202 by searching and/or analyzing certain information about computing device 202. In one example, determination module 106 may search the request to stream presentation data 150 for information about computing device 202. In this example, while searching the request in this way, determination module 106 may identify and/or extrapolate certain information about computing device 202. Such information may identify, indicate, and/or be used to determine certain characteristics, attributes, and/or features of computing device 202 in connection with the request.

As a specific example, determination module 106 may determine the make and/or model of computing device 202 by examining the streaming request. In one example, determination module 106 may search a database and/or the Internet for information (e.g., technical documentation) about the built-in speaker of and/or acoustic transducer incorporated into that make and/or model of computing device 202. Additionally or alternatively, determination module 106 may search the request itself for information about the built-in speaker on and/or acoustic transducer incorporated into that make and/or model of computing device 202. In one embodiment, the request may even include information that describes and/or communicates one or more portions of the acoustic transducer's frequency response.

In some examples, as part of a media streaming customer base, computing device 202 may formulate and/or generate the streaming request to include information about computing device 202, one or more acoustic transducers communicatively coupled to computing device 202, and/or the environment in which computing device 202 is located. For example, if the user of computing device 202 has installed and/or attached a set of headphones, earbuds, and/or external speakers, computing device 202 may formulate and/or generate the streaming request to identify and/or indicate the make and/or model of the set of headphones, earbuds, and/or external speakers. Additionally or alternatively, computing device 202 may formulate and/or generate the streaming request to identify and/or indicate whether computing device 202 is located indoors or outdoors. Computing device 202 may also formulate and/or generate the streaming request to identify and/or indicate certain acoustic properties of the environment in which computing device 202 is located.

In some examples, determination module 106 may analyze the request to stream presentation data 150 to computing device 202. In one example, determination module 106 and/or identification module 108 may identify, within the request, information indicative of the characteristic of computing device 202. In this example, determination module 106 may determine that computing device 202 has that particular characteristic based at least in part on the information identified within the request.

Returning to FIG. 3, at step 330 one or more of the systems described herein may identify a compressed version of the presentation data that corresponds to the characteristic of the computing device. For example, identification module 108 may, as part of computing device 206 or computing device 208 in FIG. 2, identify compressed version of presentation data 152(1) as corresponding to and/or matching the characteristic of computing device 202. In this example, compressed version of presentation data 152(1) may constitute and/or represent the one that is best suited and/or most efficient for playback on computing device 202 within compressed versions of presentation data 152(1)-(N). In some embodiments, compressed version of presentation data 152(1) may satisfy a certain playback quality threshold with respect to computing device 202 and/or a certain data efficiency or bandwidth threshold with respect to network 204.

In some examples, of all the compressed versions of presentation data 152(1)-(N) relative to the request, compressed version of presentation data 152(1) may include and/or contain all the digital data whose content the user is able to perceive when presented by computing device 202. However, in such examples, compressed version of presentation data 152(1) may exclude and/or omit much, if not all, the digital data whose content the user is unable to perceive when presented by computing device 202. Accordingly, compressed version of presentation data 152(1) may constitute and/or exemplify an efficient, condensed representation of presentation data 150 as applied to computing device 202 and/or its technical features or limitations.

Furthermore, just as compressed version of presentation data 152(1) may constitute and/or represent the version best suited for playback on computing device 202, compressed version of presentation data 152(N) may constitute and/or represent the version best suited for playback on one or more additional computing devices. Accordingly, each compressed version of presentation data 152(1)-(N) may be tailored and/or bespoke for the specifications of a certain playback environment.

The systems described herein may perform step 330 in a variety of ways and/or contexts. In some examples, identification module 108 may select compressed version of presentation data 152(1) for streaming to computing device 202 in response to the request. In one example, identification module 108 may make the selection of compressed version of presentation data 152(1) based at least in part on the characteristic of computing device 202. For example, identification module 108 may identify compressed version of presentation data 152(1) as having the closest match to the frequency response of the acoustic transducer associated with computing device 202. In this example, compressed version of presentation data 152(1) may include and/or represent only media data that computing device 202 is able to perceivably present to the user via the acoustic transducer. Thus, compressed version of presentation data 152(1) may exclude and/or omit all media data included in presentation data 150(1) that computing device 202 is unable to perceivably present to the user via the acoustic transducer.

In some examples, identification module 108 may search a lookup table (within, e.g., computing device 206 or computing device 208) for an entry corresponding to the characteristic of the computing device 202. For example, identification module 108 may search the lookup table for an entry corresponding to the make and/or model of computing device 202. In another example, identification module 108 may search the lookup table for an entry corresponding to the make and/or model of an acoustic transducer known to be built into computing device 202. During this search, identification module 108 may identify the correct entry within the lookup table. This entry may include information that indicates and/or is used to determine which compressed version of presentation data 152(1)-(N) corresponds to the characteristic of computing device 202.

In one example, identification module 108 and/or determination module 106 may use the information stored in that entry to determine compressed version of presentation data 152(1)-(N) corresponds to the characteristic of computing device 202. For example, identification module 108 may find, within that lookup table entry, information indicating that compressed version of presentation data 152(1) corresponds to and/or matches the characteristic of computing device 202. In other words, this information within that lookup table entry may indicate and/or be used to determine that compressed version of presentation data 152(1) is the one best suited and/or most efficient (in terms of, e.g., bandwidth) for computing device 202. Identification module 108 may then select that compressed version of presentation data 152(1) for streaming to computing device 202 in response to the request.

In some examples, modeling module 112 may, as part of computing device 206 and/or computing device 208, compute a set of loss models 250(1)-(N) for certain playback devices and/or environments. In such examples, loss models 250(1)-(N) may each include and/or represent a compression standard, codec, and/or algorithm that facilitates compressing media data into condensed, more efficient versions. As a specific example, computing device 206 may execute and/or launch encoder module 114 that applies loss models 250(1)-(N) to presentation data 150. By applying loss models 250(1)-(N) to presentation data 150 in this way, encoder module 114 may generate and/or produce compressed versions of presentation data 152(1)-(N), respectively. Accordingly, compressed version of presentation data 152(1) may correspond to and/or derive from loss model 250(1), and compressed version of presentation data 152(N) may correspond to and/or derive from loss model 250(N).

In some examples, modeling module 112 may compute and/or calculate loss models 250(1)-(N) from a variety of different information about computing device 202 and/or its accessories. In one example, modeling module 112 may compute and/or calculate loss models 250(1)-(N) from information obtained during behavioral laboratory experiments performed on various devices expected to request streaming data from the media streaming service. For example, technicians of the media streaming service may test and/or determine the frequency response of the built-in speaker and/or acoustic transducer on a device that is similar and/or identical to computing device 202. In this example, modeling module 112 may compute and/or calculate loss model 250(1) based at least in part on the results of that test and/or determination.

Additionally or alternatively, modeling module 112 may compute and/or calculate loss models 250(1)-(N) from information obtained from technical documentation for various devices expected to request streaming data from the media streaming service. For example, modeling module 112 and/or identification module 108 may query a remote device via network 204 and/or a local database for technical documentation specific to certain playback devices and/or accessories. In this example, modeling module 112 may compute and/or calculate loss model 250(1) based at least in part on technical documentation for computing device 202 and/or its accessories.

In some examples, one or more of loss models 250(1)-(N) may constitute and/or represent an aggregated loss model that corresponds to and/or matches multiple playback devices and/or accessories. For example, one of loss models 250(1)-(N) may be designed to address and/or correspond to certain characteristics of a set of distinct playback devices. In this example, multiple loss models may be distilled and/or concentrated into a single loss model that corresponds to and/or matches the entire set of distinct playback devices to a certain degree. Accordingly, although these distinct playback devices differ from one another, the single loss model may be used to generate and/or produce compressed versions of presentation data that satisfy and/or fit the needs of the playback devices (e.g., sufficient data to reproduce the presentation data) as well as the needs of the streaming network (e.g., limited bandwidth consumption and/or usage).

In some examples, storage module 116 may, as part of computing device 206 and/or computing device 208, store compressed versions of presentation data 152(1)-(N) in a storage device to facilitate streaming those compressed versions to playback devices at future times. Accordingly, in one example, compressed versions of presentation data 152(1)-(N) may already be generated and/or ready for future streaming before receiving module 104 receives requests for the same. In an alternative example, compressed versions of presentation data 152(1)-(N) may be generated in real-time during the corresponding streaming sessions.

In some examples, modeling module 112 may compute and/or calculate one or more of loss models 250(1)-(N) based at least in part on the type of audio content (e.g., musical instruments, singing, speech, whispering, weather noises, etc.) captured in presentation data 150. For example, modeling module 112 and/or determination module 106 may determine a type of audio content represented in presentation data 150. Modeling module 112 may then compute and/or calculate loss models 250(1)-(N) based at least in part on the characteristic of computing device 202 and the type of audio content represented in presentation data 150.

In some examples, encoder module 114 may encode and/or compress presentation data 150 by excluding and/or omitting certain portions of presentation data 150 that would be imperceptible to users upon playback. For example, encoder module 114 may apply loss model 250(1) to presentation data 150. By doing so, encoder module 114 may identify at least one portion of presentation data 150 that computing device 202 is unable to perceivably present to the user due at least in part to the characteristic of computing device 202. In other words, this portion of presentation data 150 may be undetectable and/or imperceptible from the user's perspective if computing device 202 were to play back and/or reproduce this portion of presentation data 150. As a result, encoder module 114 may exclude and/or omit such imperceptible portions from compressed version of presentation data 152(1) to preserve bandwidth during corresponding streaming sessions.

Figure 5:
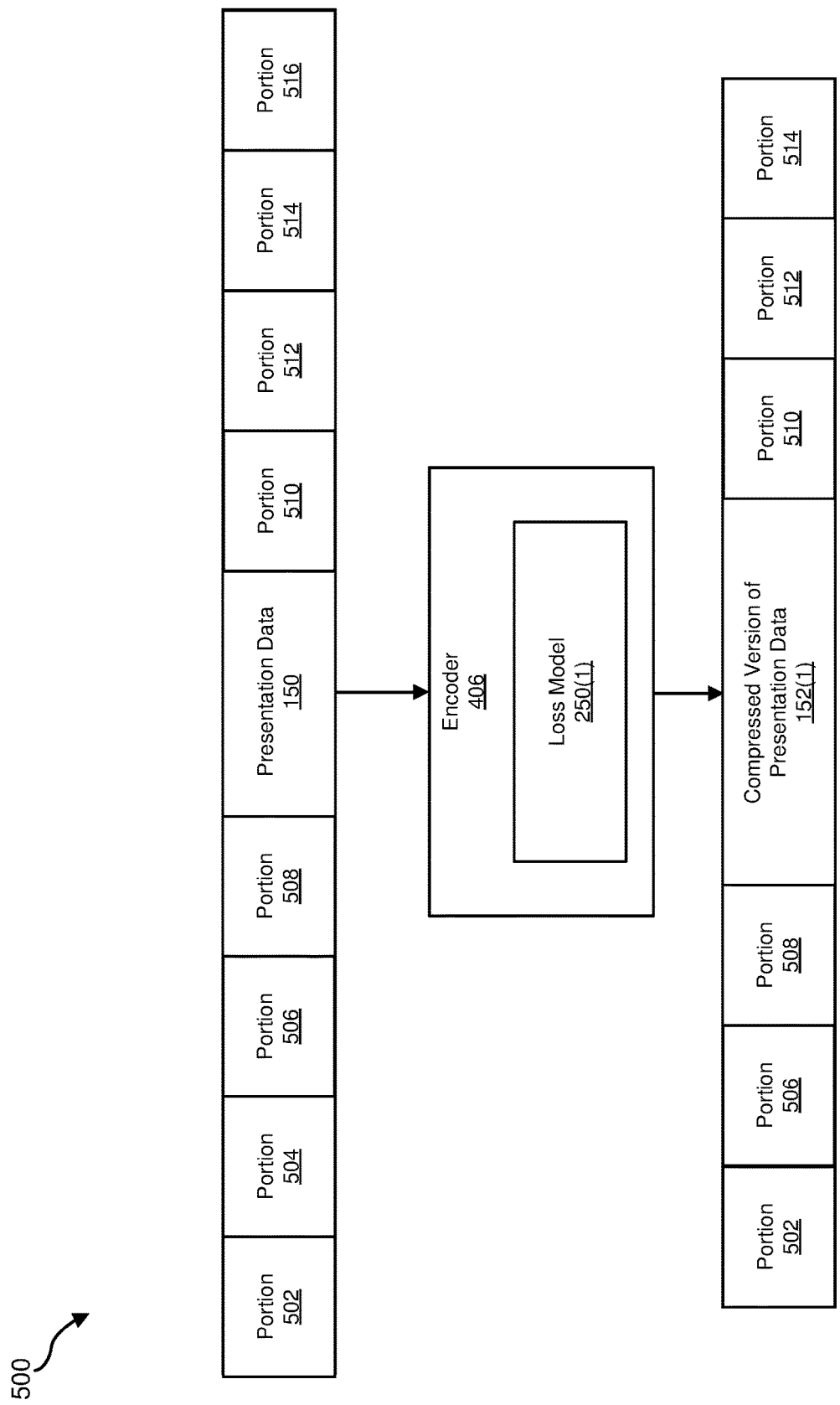
FIG. 5 is a block diagram of an exemplary implementation in which presentation data is compressed via a loss model tailored to a specific playback environment.

FIG. 5 illustrates an exemplary implementation 500 in which presentation data 150 is compressed via a loss model 250(1) tailored to a specific playback device (e.g., computing device 202 and/or an associated user interface). As illustrated in FIG. 5, presentation data 150 may include and/or represent various data segments and/or portions, such as portions 502, 504, 506, 508, 510, 512, 514, and 516. In one example, loss model 250(1) may correspond to and/or match a specific playback device that has requested to stream the file represented by presentation data 150. To encode and/or compress presentation data 150 for streaming to certain devices like that playback device, encoder 406 may apply loss model 250(1) to presentation data 150 to generate and/or produce compressed version of presentation data 152(1), which includes and/or represents fewer data segments and/or portions than presentation data 150.

As illustrated in FIG. 5, compressed version of presentation data 152(1) may include and/or represent portions 502, 506, 508, 510, 512, and 514. In some examples, compressed version of presentation data 152(1) may exclude and/or omit certain data segments and/or portions, such as portions 504 and 516, that were included and/or represented in presentation data 150. In one embodiment, the playback device to which loss model 250(1) corresponds and/or is matched may be unable to reproduce and/or perceivably present portions 504 and/or 516 to the user due at least in part to certain technological limitations (e.g., deficient acoustics).

Figure 6:
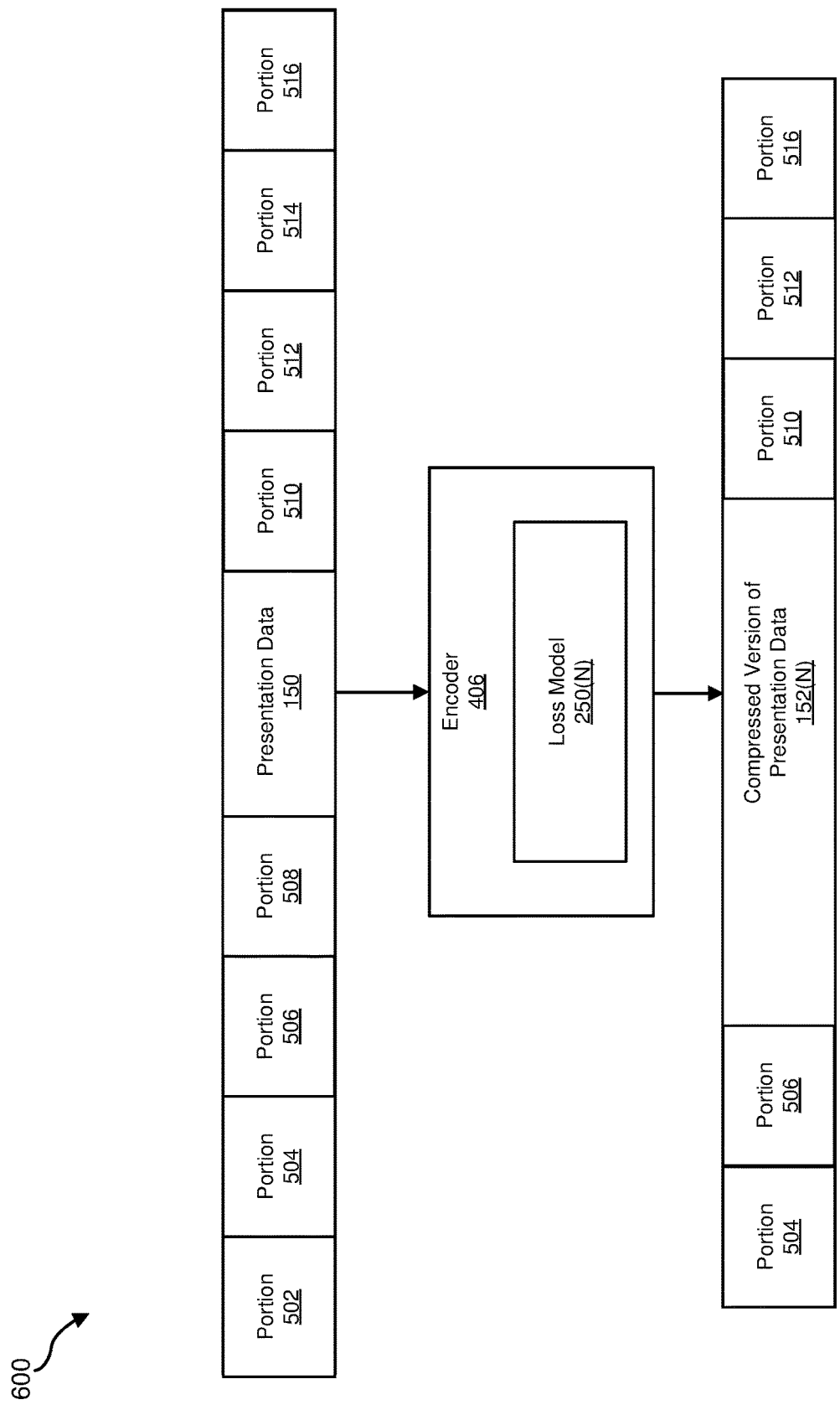
FIG. 6 is a block diagram of an additional exemplary implementation in which presentation data is compressed via a loss model tailored to a specific playback environment.

FIG. 6 illustrates an exemplary implementation 600 in which presentation data 150 is compressed via a loss model 250(N) tailored to a different playback device. As illustrated in FIG. 6, presentation data 150 may include and/or represent various data segments and/or portions, such as portions 502, 504, 506, 508, 510, 512, 514, and 516. In one example, loss model 250(N) may correspond to and/or match a different playback device that has requested to stream the file represented by presentation data 150. To encode and/or compress presentation data 150 for streaming to relevant playback devices, encoder 406 may apply loss model 250 (N) to presentation data 150 to generate and/or produce compressed version of presentation data 152(N), which includes and/or represents fewer data segments and/or portions than presentation data 150.

As illustrated in FIG. 5, compressed version of presentation data 152(N) may include and/or represent portions 504, 506, 510, 512, and 516. In some examples, compressed version of presentation data 152(N) may exclude and/or omit certain data segments and/or portions, such as portions 502, 508, and 514, that were included and/or represented in presentation data 150. In one embodiment, the playback device to which loss model 250(N) corresponds and/or is matched may be unable to reproduce and/or perceivably present portions 502, 508, and/or 514 to the user due at least in part to certain technological limitations (e.g., deficient acoustics).

In some examples, encoder module 114 may encode and/or compress presentation data 150 by modifying and/or altering portions of presentation data 150 whose perceptible quality would be below a certain threshold upon playback. For example, by applying loss model 250(1) to presentation data 150, encoder module 114 may identify at least one portion of presentation data 150 whose perceptible quality would be impaired by the characteristic of computing device 202 during playback. In other words, this portion of presentation data 150 may be directly affected by the characteristic of computing device 202. In this example, encoder module 114 may modify and/or alter such portions as incorporated into compressed version of presentation data 152(1) to improve the playback quality from the user's perspective despite the characteristic of computing device 202.

As a specific example, encoder module 114 may modify one or more portions of compressed version of presentation data 152(1) by altering an energy level of at least one frequency band represented in such portions. Additionally or alternatively, encoder module 114 may modify one or more portions of compressed version of presentation data 152(1) by altering at least one attribute of such portions. Examples of such attributes include, without limitation, bass, frequency, pitch, tone, range, timbre, volume, combinations or variations of one or more of the same, and/or any other suitable attributes of presentation data.

Figure 7:
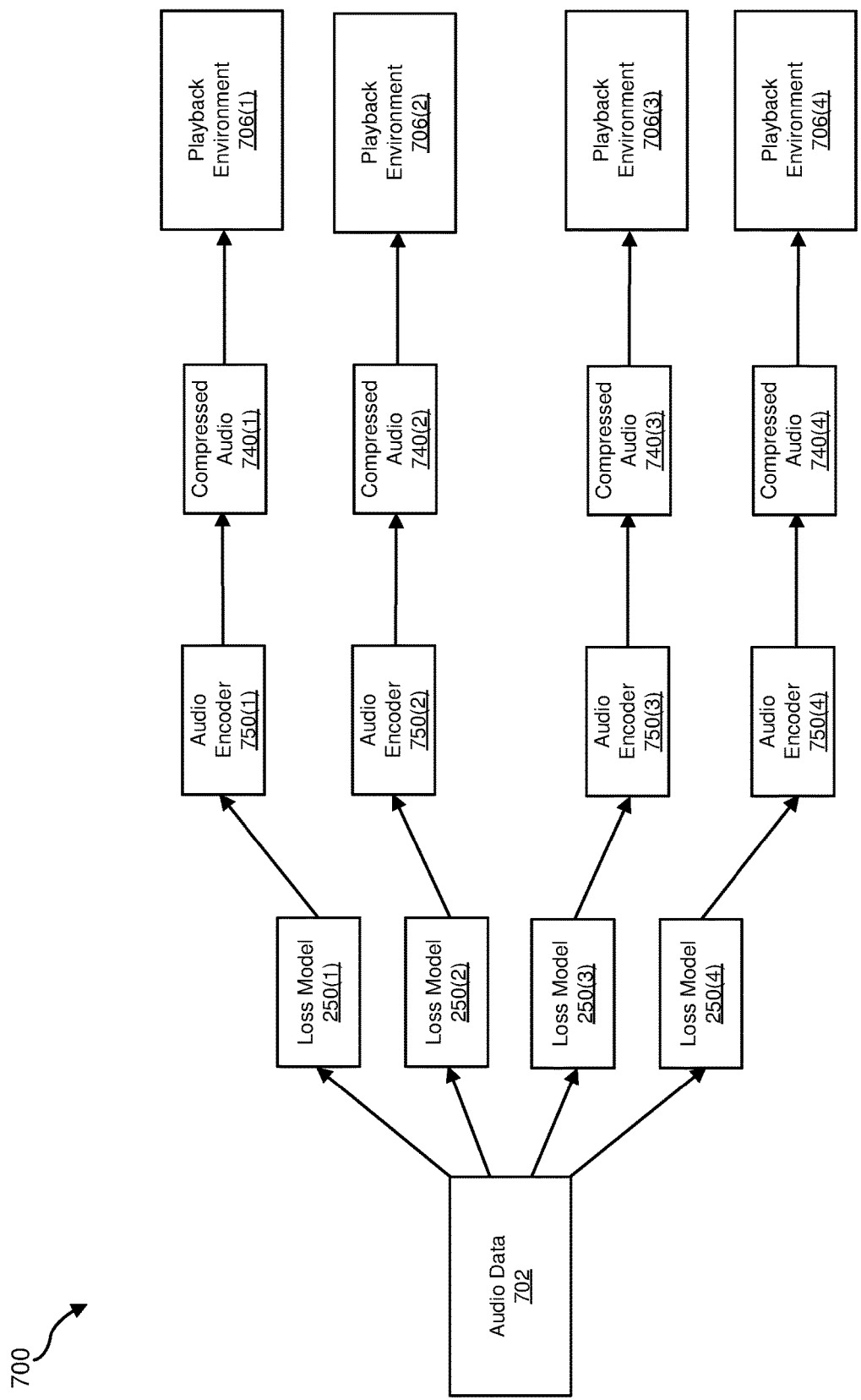
FIG. 7 is a block diagram of an exemplary visual representation of a distribution model for tailoring media encoding to playback environments.

FIG. 7 illustrates an exemplary visual representation 700 of a distribution model for tailoring media encoding to playback environments. In one example, the distribution model illustrated in visual representation 700 may include audio data 702 that is fed to loss models 250(1), 250(2), 250(3), and 250(4) implemented by audio encoders 750(1), 750(2), 750(3), and 750(4), respectively. As a result, audio encoders 750(1), 750(2), 750(3), and 750(4) may generate and/or produce compressed audio 740(1), 740(2), 740(3), and 740(4), respectively, from audio data 702. As illustrated in FIG. 7, the exemplary distribution model may include and/or involve playback environments 706(1), 706(2), 706(3), and 706(4) to which compressed audio 740(1), 740(2), 740(3), and 740(4), respectively, correspond and/or are matched.

Accordingly, if playback environment 706(1) were to request to stream audio data 702, playback environment 706(1) may receive compressed audio 740(1) in satisfaction of that request. Similarly, if playback environment 706(3) were to request to stream audio data 702, playback environment 706(3) may receive compressed audio 740(3) in satisfaction of that request.

Figure 8:
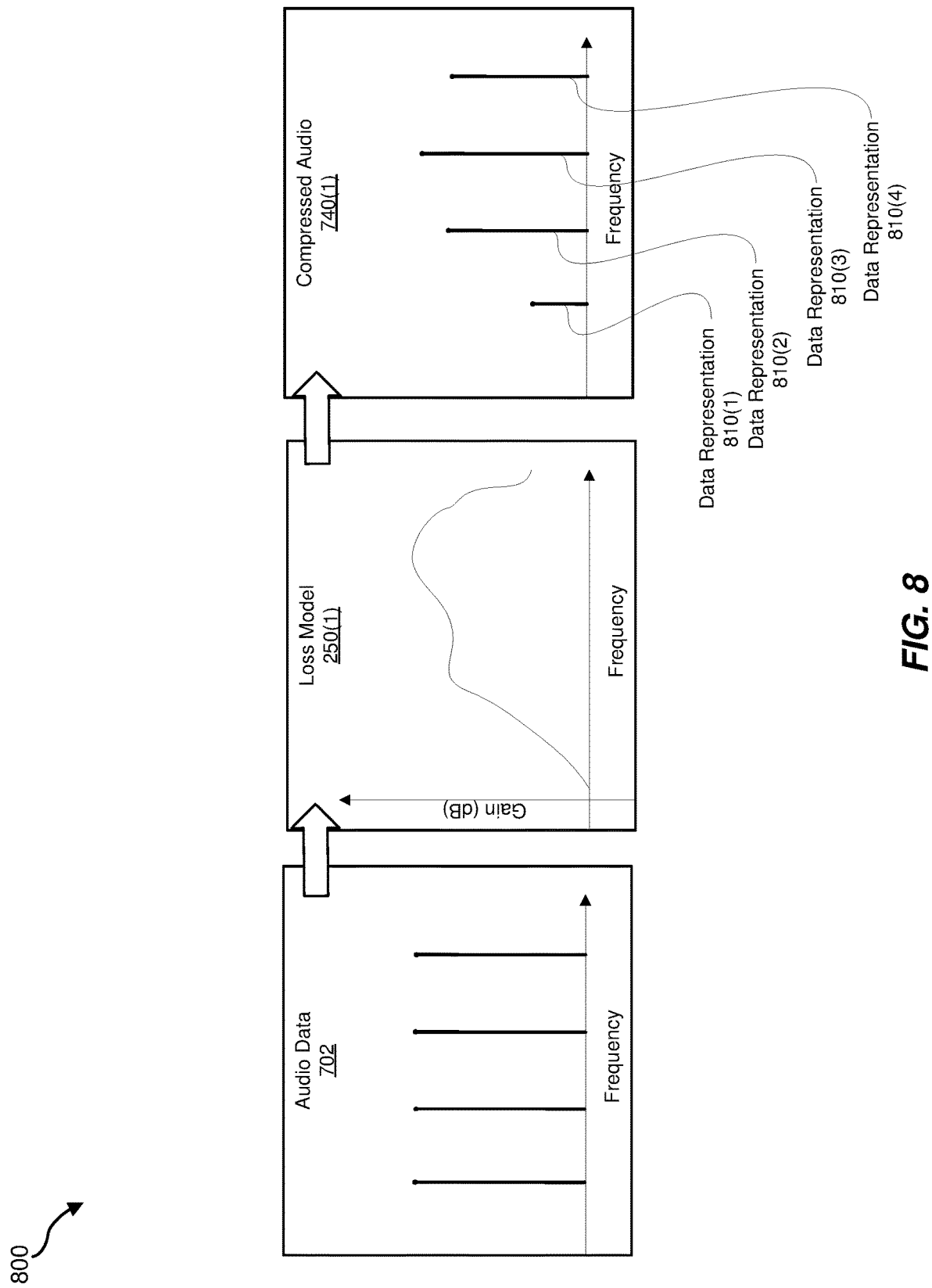
FIG. 8 is an illustration of an exemplary loss model being applied to audio data to produce compressed audio tailored to a specific playback environment.

FIG. 8 illustrates an exemplary loss model 250(1) as applied to audio data 702 to produce compressed audio 740(1), which is tailored to a specific playback environment. As illustrated in FIG. 8, loss model 250(1) may be visually represented in terms of gain (decibels) in the frequency domain. In one example, compressed audio 740(1) may include and/or contain data representations 810(1), 810(2), 810(3), and/or 810(4) in the frequency domain. In this example, data representations 810(1)-(4) may include and/or represent varying amounts of data relative to one another. For example, within compressed audio 740(1) in FIG. 8, data representation 810(1) may include and/or represent the least amount of data, and data representation 810(3) may include and/or represent the most amount of data.

Returning to FIG. 3, at step 340 one or more of the systems described herein may stream the compressed version of the presentation data that corresponds to the characteristic of the computing device. For example, streaming module 110 may, as part of computing device 206 or computing device 208 in FIG. 2, stream compressed version of presentation data 152(1) that corresponds to the characteristic of computing device 202. In this example, one or more portions of compressed version of presentation data 152(1) may traverse from computing device 206 or 208 to computing device 202 via network 204 during a streaming session.

The systems described herein may perform step 340 in a variety of ways and/or contexts. In some examples, streaming module 110 may direct computing device 206 or 208 to send, transfer, and/or transmit compressed version of presentation data 152(1) to computing device 202 via network 204. In such examples, upon receiving compressed version of presentation data 152(1) via network 204, computing device 202 may decompress and/or decode compressed version of presentation data 152(1), thereby potentially restoring much of this compressed version to presentation data 150. In one example, computing device 202 may convert the decompressed and/or decoded version of such presentation data to an analog signal to facilitate presenting and/or playing the data to the user. Computing device 202 may then present and/or play the decompressed and/or decoded version of such presentation data to the user via one or more user interfaces (e.g., acoustic transducers and/or video displays).

Figure 4:
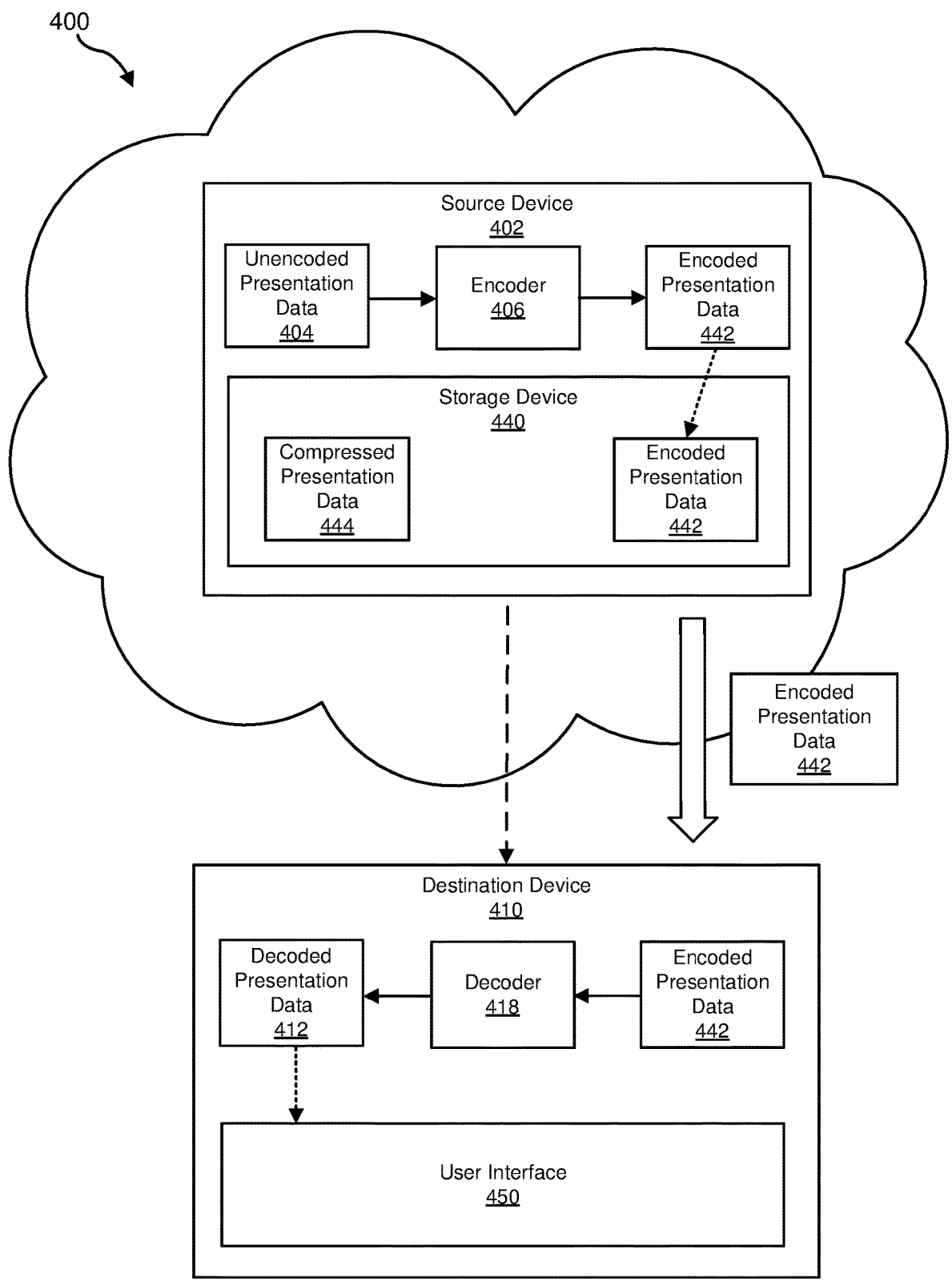
FIG. 4 is a block diagram of an additional exemplary system for tailoring media encoding to playback environments.

FIG. 4 illustrates an exemplary system 400 that includes and/or represents a source device 402 and a destination device 410 in communication with one another via network 204. Although not illustrated in FIG. 4, one or more of modules 102 may run on and/or be executed by source device 402 and/or destination device 410 to perform any of the tasks and/or operations described below. In one example, source device 402 may obtain and/or store unencoded presentation data 404. In this example, source device 402 may include, implement, and/or deploy an encoder 406 that encodes and/or compresses unencoded presentation data 404. As a result, encoder 406 may generate and/or produce encoded presentation data 442 from unencoded presentation data 404. Source device 402 may also generate and/or produce compressed presentation data 444 from unencoded presentation data 404 and/or additional presentation data.

As illustrated in FIG. 4, source device 402 may include, represent, and/or be coupled to a storage device 440. In some examples, source device 402 may store and/or maintain encoded presentation data 442 and/or compressed presentation data 444 in storage device 440. In one example, source device 402 may stream, send, and/or transfer encoded presentation data 442 to destination device 410 via network 204 upon request. In this example, destination device 410 may include, implement, and/or deploy a decoder 418 that decodes and/or decompresses encoded presentation data 442. As a result, decoder 418 may generate and/or produce decoded presentation data 412 from encoded presentation data 442. In this example, destination device 410 may include, represent, and/or be coupled to a user interface 450 (e.g., an acoustic transducer and/or a video display) that presents decoded presentation data 412 to an end-user. In some embodiments, to facilitate presenting decoded presentation data 412 to the end-user, destination device 410 may convert decoded presentation data 412 to an analog signal.

EXAMPLE EMBODIMENTS

Example 1: A system comprising (1) a receiving module, stored in memory, that receives a request to stream presentation data to a computing device, (2) a determination module, stored in memory, that determines at least one characteristic of the computing device in connection with the request, (3) an identification module, stored in memory, that identifies a compressed version of the presentation data that corresponds to the characteristic of the computing device, (4) a streaming module, stored in memory, that streams the compressed version of the presentation data to the computing device to facilitate presentation of the presentation data to a user of the computing device, and (5) at least one physical processor configured to execute the receiving module, the determination module, the identification module, and the streaming module.

Example 2: The system of Example 1, wherein the presentation data comprises audio data and/or video data.

Example 3: The system of Example 1, further comprising (1) a modeling module, stored in memory, that computes a loss model based at least in part on the characteristic of the computing device, and (2) an encoder module, stored in memory, that applies the loss model to the presentation data to generate the compressed version of the presentation data, wherein the physical processor is further configured to execute the modeling module and the encoder module.

Example 4: The system of Example 3, further comprising a storage module that stores the compressed version of the presentation data in a storage device to facilitate streaming the compressed version of the presentation data at a subsequent moment in time, wherein the physical processor is further configured to execute the storage module.

Example 5: The system of Example 4, wherein (1) the modeling module computes at least one additional loss model based at least in part on at least one characteristic of an additional computing device, and (2) the encoder module that applies the additional loss model to the presentation data to generate an additional compressed version of the presentation data, the storage module stores the additional compressed version of the presentation data in the storage device to facilitate streaming the additional compressed version of the presentation data at an additional subsequent moment in time.

Example 6: The system of Example 5, wherein (1) the receiving module receives an additional request to stream the presentation data to the additional computing device, (2) the determination module determines the characteristic of the additional computing device in connection with the additional request, (3) the identification module identifies the additional compressed version of the presentation data as corresponding to the characteristic of the additional computing device, and (4) the streaming module streams the additional compressed version of the presentation data to the additional computing device to facilitate presentation of the presentation data to a user of the additional computing device.

Example 7: The system of Example 3, wherein (1) the presentation data comprises audio data and (2) the modeling module computes the loss model by (A) determining a type of audio content represented in the audio data and (B) computing the loss model based at least in part on the characteristic of the computing device and the type of audio content represented in the audio data.

Example 8: The system of Example 3, wherein the encoder module applies the loss model to the presentation data by (1) identifying at least one imperceptible portion of the presentation data that the computing device is unable to perceivably present to the user due at least in part to the characteristic of the computing device and (2) omitting the imperceptible portion of the presentation data from the compressed version of the presentation data.

Example 9: The system of Example 3, wherein the encoder module applies the loss model to the presentation data by (1) identifying at least a portion of the presentation data whose perceptible quality is impaired by the characteristic of the computing device and (2) modifying the portion of the presentation data to improve the perceptible quality despite the characteristic of the computing device.

Example 10: The system of Example 9, wherein the encoder module modifies the portion of the presentation data by altering an energy level of at least one frequency band represented in the portion of the presentation data.

Example 11: The system of Example 3, wherein the encoder module modifies the portion of the presentation data by altering an attribute of the portion of the presentation data, wherein the attribute of the portion of the presentation data comprises a bass level of audio content represented in the presentation data, a frequency of audio content represented in the presentation data, a pitch of audio content represented in the presentation data, a tone of audio content represented in the presentation data, a range of audio content represented in the presentation data, a timbre of audio content represented in the presentation data, and/or a volume of audio content represented in the presentation data.

Example 12: The system of Example 1, wherein the characteristic of the computing device comprises a frequency response of an acoustic transducer associated with the computing device, a material incorporated in the acoustic transducer associated with the computing device, a size of the acoustic transducer associated with the computing device, and/or an enclosure of the acoustic transducer associated with the computing device.

Example 13: The system of Example 1, wherein the acoustic transducer comprises headphones communicatively coupled to the computing device, a built-in speaker of the computing device, and/or an external speaker communicatively coupled to the computing device.

Example 14: The system of Example 1, wherein the computing device decompresses the compressed version of the presentation data and/or presents the presentation data to the user via a user interface by executing the decompressed version of the presentation data.

Example 15: The system of Example 1, wherein the determination module determines the characteristic of the computing device by (1) analyzing the request to stream the presentation data to the computing device, (2) identifying, within the request, information indicative of the characteristic of the computing device, and then (3) determining, based at least in part on the information identified within the request, that the computing device has the characteristic.

Example 16: The system of Example 15, wherein the identification module identifies the compressed version of the presentation data by searching a lookup table for an entry that indicates which compressed version of the presentation data corresponds to the characteristic of the computing device based at least in part on the information identified within the request.

Example 17: A media-streaming device comprising (1) at least one storage device that stores compressed versions of presentation data available for streaming to mobile devices and (2) at least one physical processor communicatively coupled to the storage device, wherein the physical processor (A) receives a request to stream the presentation data to a mobile device, (B) determines at least one characteristic of the mobile device in connection with the request, (C) selects, from the storage device, a compressed version of the presentation data that corresponds to the characteristic of the mobile device, and (D) streams the compressed version of the presentation data to the mobile device to facilitate presentation of the presentation data to a user of the mobile device.

Example 18: The media-streaming device of Example 17, wherein the presentation data comprises audio data and/or video data.

Example 19: The media-streaming device of Example 17, wherein the physical processor (1) computes a loss model based at least in part on the characteristic of the computing device and (2) applies the loss model to the presentation data to generate the compressed version of the presentation data.

Example 20: A computer-implemented method comprising (1) receiving a request to stream presentation data to a computing device, (2) determining at least one characteristic of the computing device in connection with the request, (3) identifying a compressed version of the presentation data that corresponds to the characteristic of the computing device, and then (4) streaming the compressed version of the presentation data to the computing device to facilitate presentation of the presentation data to a user of the computing device.

In certain embodiments, one or more of the modules described herein may transform data, physical devices, and/or representations of physical devices from one form to another. For example, one or more of the modules recited herein may transform an unencoded version of audio data into an encoded version of that audio data and then stream the encoded version of that audio data to an end-user device for decoding and/or presenting to a user. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a receiving module, stored in memory, that receives a request to stream presentation data to a computing device;
   a determination module, stored in memory, that determines at least one characteristic of the computing device in connection with the request;
   a modeling module, stored in memory, that computes a loss model based at least in part on the characteristic of the computing device;
   an encoder module, stored in memory, that applies the loss model to the presentation data to generate a compressed version of the presentation data;
   an identification module, stored in memory, that identifies the compressed version of the presentation data that corresponds to the characteristic of the computing device;
   a streaming module, stored in memory, that streams the compressed version of the presentation data to the computing device to facilitate presentation of the presentation data to a user of the computing device; and
   at least one physical processor configured to execute the receiving module, the determination module, the modeling module, the encoder module, the identification module, and the streaming module.

2. The system of claim 1, wherein the presentation data comprises at least one of:
   audio data; or
   video data.

3. The system of claim 1, further comprising a storage module that stores the compressed version of the presentation data in a storage device to facilitate streaming the compressed version of the presentation data at a subsequent moment in time; and
   wherein the physical processor is further configured to execute the storage module.

4. The system of claim 3, wherein:
   the modeling module computes at least one additional loss model based at least in part on at least one characteristic of an additional computing device;
   the encoder module that applies the additional loss model to the presentation data to generate an additional compressed version of the presentation data; and
   the storage module stores the additional compressed version of the presentation data in the storage device to facilitate streaming the additional compressed version of the presentation data at an additional subsequent moment in time.

5. The system of claim 4, wherein:
   the receiving module receives an additional request to stream the presentation data to the additional computing device;
   the determination module determines the characteristic of the additional computing device in connection with the additional request;
   the identification module identifies the additional compressed version of the presentation data as corresponding to the characteristic of the additional computing device; and
   the streaming module streams the additional compressed version of the presentation data to the additional computing device to facilitate presentation of the presentation data to a user of the additional computing device.

6. The system of claim 1, wherein:
   the presentation data comprises audio data; and
   the modeling module computes the loss model by:
      determining a type of audio content represented in the audio data; and
      computing the loss model based at least in part on the characteristic of the computing device and the type of audio content represented in the audio data.

7. The system of claim 1, wherein the encoder module applies the loss model to the presentation data by:

identifying at least one imperceptible portion of the presentation data that the computing device is unable to perceivably present to the user due at least in part to the characteristic of the computing device; and omitting the imperceptible portion of the presentation data from the compressed version of the presentation data.

8. The system of claim 1, wherein the encoder module applies the loss model to the presentation data by:

identifying at least a portion of the presentation data whose perceptible quality is impaired by the characteristic of the computing device; and modifying the portion of the presentation data to improve the perceptible quality despite the characteristic of the computing device.

9. The system of claim 8, wherein the encoder module modifies the portion of the presentation data by altering an energy level of at least one frequency band represented in the portion of the presentation data.

10. The system of claim 8, wherein the encoder module modifies the portion of the presentation data by altering an attribute of the portion of the presentation data, wherein the attribute of the portion of the presentation data comprises at least one of:

a bass level of audio content represented in the presentation data;

a frequency of audio content represented in the presentation data;

a pitch of audio content represented in the presentation data;

a tone of audio content represented in the presentation data;

a range of audio content represented in the presentation data;

a timbre of audio content represented in the presentation data; or a volume of audio content represented in the presentation data.

11. The system of claim 1, wherein the characteristic of the computing device comprises at least one of:

a frequency response of an acoustic transducer associated with the computing device;

a material incorporated in the acoustic transducer associated with the computing device;

a size of the acoustic transducer associated with the computing device; or an enclosure of the acoustic transducer associated with the computing device.

12. The system of claim 11, wherein the acoustic transducer comprises at least one of:

headphones communicatively coupled to the computing device;

a built-in speaker of the computing device; or an external speaker communicatively coupled to the computing device.

13. The system of claim 1, wherein the computing device:

decompresses the compressed version of the presentation data; and presents the presentation data to the user via a user interface by executing the decompressed version of the presentation data.

14. The system of claim 1, wherein the determination module determines the characteristic of the computing device by:

analyzing the request to stream the presentation data to the computing device; and identifying, within the request, information indicative of the characteristic of the computing device; and determining, based at least in part on the information identified within the request, that the computing device has the characteristic.

15. The system of claim 14, wherein the identification module identifies the compressed version of the presentation data by searching a lookup table for an entry that indicates which compressed version of the presentation data corresponds to the characteristic of the computing device based at least in part on the information identified within the request.

16. A media-streaming device comprising:

at least one storage device that stores compressed versions of presentation data available for streaming to mobile devices; and at least one physical processor communicatively coupled to the storage device, wherein the physical processor:

receives a request to stream the presentation data to a mobile device;

determines at least one characteristic of the mobile device in connection with the request;

computes a loss model based at least in part on the characteristic of the mobile device;

applies the loss model to the presentation data to generate a compressed version of the presentation data;

selects, from the storage device, the compressed version of the presentation data that corresponds to the characteristic of the mobile device; and streams the compressed version of the presentation data to the mobile device to facilitate presentation of the presentation data to a user of the mobile device.

17. The media-streaming device of claim 16, wherein the presentation data comprises at least one of:

audio data; or video data.

18. A computer-implemented method comprising:

receiving a request to stream presentation data to a computing device;

determining at least one characteristic of the computing device in connection with the request;

computing a loss model based at least in part on the characteristic of the computing device;

applying the loss model to the presentation data to generate a compressed version of the presentation data;

identifying the compressed version of the presentation data that corresponds to the characteristic of the computing device; and streaming the compressed version of the presentation data to the computing device to facilitate presentation of the presentation data to a user of the computing device.

* * * * *